Patented June 9, 1931

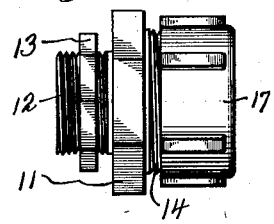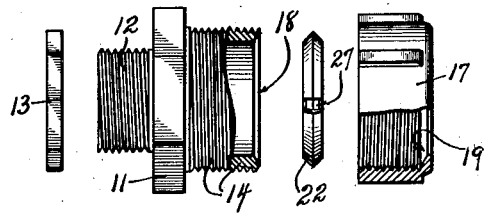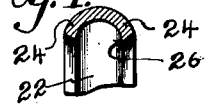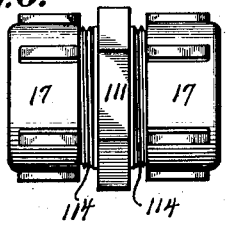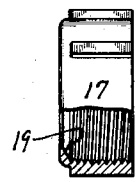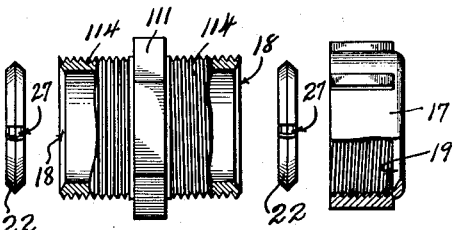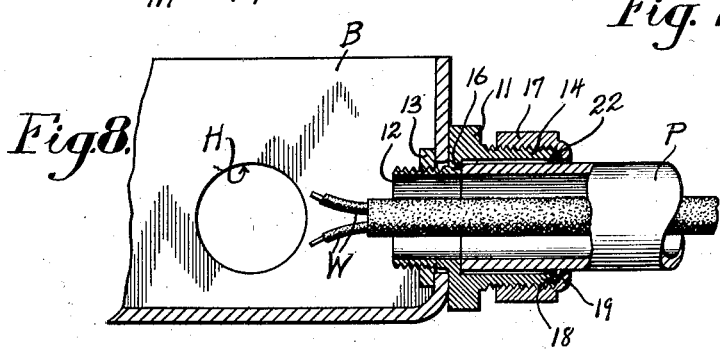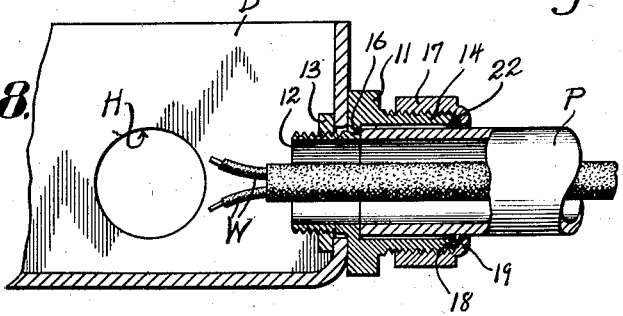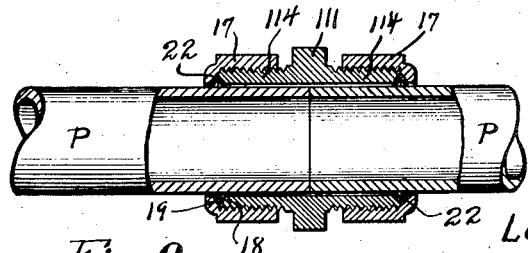

1,809,582

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

PIPE COUPLER

Application filed December 31, 1926. Serial No. 158,145.

This invention relates to pipe couplers to connect together two pipes or to anchor a pipe or conduit to electric outlet fixture boxes and the like where the pipe is smooth ended and without threads, a main purpose being to connect non-threaded pipe.

Couplers have heretofore been proposed which included contractible sealing rings of solid cross-section, but my invention provides a novel sealing and anchorage ring having improved means to bind and seal against a smooth pipe.

A further object of the invention is to produce an improved sealing means for pipe couplers wherein the ring is capable of rapid size reduction to grip a pipe. Accordingly, a sealing ring is provided which is capable of a reduction of its interior diameter irrespective of change in its outside diameter. More particularly, the ring is concave or arched or V-shaped in cross-section, so that upon assembly with a coupler, the ring sides may be brought together thus reducing the angle therebetween and thereby reducing the interior diameter to cause the spaced inner edges of the ring to intimately engage a pipe disposed therewithin. The ring is preferably made of ductile sheet metal, thin enough to permit its spaced edges to be collapsed toward each other in a longitudinal direction, and V-shaped in cross-section, wherein the apex or outer arch preferably defines the outer circumference of the ring.

Another object of the invention is the provision of an improved sealing ring which is capable of a double reduction in size, that is, its general over-all and outside diameter may be reduced through radial contraction by one movement and its interior diameter, independent of its over-all diameter, reduced by another or subsequent movement. More particularly, a split ring is utilized for this purpose which is concave or arched or V-shaped in cross-section, so that upon assembly with a coupler, the ends of the split ring are brought together by radial contraction to reduce the outside diameter, and thereafter the sides of the ring are collapsed longitudinally to render the angle therebetween more acute and thus reduce the interior diameter. Hence the ring is capable of two reductions in which the first reduction brings the ring into intimate contact with a member such as pipe to be fastened while the second reduction enables the ring edges to be squeezed and compressed against the pipe.

During the collapsing action, the two parallel inner edges of the ring are caused to approach one another and scrape over the surface of the pipe, scraping off the enamel and surface dirt or insulation and intimately engaging the metal to effect a positive electrical ground connection, and the sealing ring is ductile so it is forced or flowed under pressure into the interstices or grain of the pipe surface or other part to be coupled.

The invention also seeks to provide a coupling sleeve or member the surfaces of which coact with the sealing ring means to effect the sealing and anchoring function. To this end cooperating surfaces of a gland nut and coupler member are so proportioned and biased as to effect a contraction of the split ring to reduce the outside and over-all diameter of the ring and collapse the walls thereof to reduce its internal diameter.

As a pipe coupler, the invention includes a coupler member formed with outwardly threaded ends each of which is adapted to receive a ring collapsing gland nut, the proximate ends of the pipes to be connected being disposed within the respective ends of the coupler member and are each engaged by a collapsed ring disposed between cooperating collapsing surfaces on the respective coupler end and gland nut.

When a pipe is anchored to an outlet box, one of the threaded coupler member ends is replaced by an end reduced in diameter to enter a knock-out opening in the outlet box, and a box hole anchorage nut is provided for the reduced end to clamp the wall of the outlet box against the coupling member.

These and other objects of the invention and the means for their attainment will be more apparent from the following detailed description, taken in connection with the accompanying drawings, illustrating examples of the invention, in which:

Figure 1 is a view showing an assembled box and pipe coupler in side elevation adapted to anchor a pipe to an electric outlet box; and Figure 2 is a view of the parts thereof in spaced relation.

Figure 3 shows the sealing ring alone and in side elevation.

Figure 4 shows in cross-section one form which the sealing ring may assume; and Figure 5 is a similar view showing another possible cross sectional formation.

Figure 6 is a view showing an assembled pipe coupler, in side elevation, adapted to join two pipes; and Figure 7 is a view of its parts separated.

Figure 8 is a box assembly view, in longitudinal section, showing a pipe anchored to an outlet box by means of the coupler shown in Figures 1 and 2.

Figure 9 is a view, in longitudinal section, showing two pipes coupled end to end by the coupler shown in Figures 6 and 7.

Figure 10 is a view, partly in section of a collapsed sealing ring, the original shape before reduction being indicated by dotted lines.

Electric outlet boxes B are generally formed with knockout openings or holes H, which may receive a pipe coupler, such as forms the subject matter of one aspect of the present invention, adapted to anchor a pipe P serving as a conduit for wires W by which electrical connections are made within the box B.

The pipe coupler includes a coupler member 11, having an outwardly threaded sleeve, neck or branch 12 to enter a box hole H and receive a box hole anchorage nut 13 which clamps the box wall between itself and a shouldered portion of the coupler member 11. Opposite the neck 12 the coupler member 11 is formed with an outwardly threaded pipe receiving neck 14 having an interior diameter sufficient to receive a pipe P and illustrated as preferably terminating in a shoulder 16 against which the pipe P abuts.

Adapted to be threaded onto the neck 14, is an apertured cap or ring gland nut 17 which cooperates with the coupler member 11 to secure a pipe P therewithin. The outer extremity of the coupler neck 14 is inwardly bevelled as at 18 and the gland nut 17 is formed, about its aperture, with a cooperating similar bevelled surface 19 biased with respect to the bevelled surface 18. The two biased ring surfaces are substantially of the same diameter.

These bevelled surfaces 18 and 19 are adapted to receive between them a sealing and anchorage gland ring 22 which is adapted to bear upon the outer peripheral surface of a pipe P by reason of the longitudinal approach of the two surfaces 18 and 19 and by reason of pressure exerted throughout the circular length of the similar beveled surfaces of the ring, coupler member and gland nut. Pressure imposed on the ring by the surfaces 18 and 19 sets up a wedging action causing the ring to undergo relative sliding radial size reducing movement.

The ring is arched in cross-section and may be, for instance, concave as shown in Figure 4 or V-shaped as shown in Figure 5. The angle between the general direction of the two sides 24 is greater than the angle between the planes including the coupler and nut surfaces 18 and 19, so that as the surfaces 18 and 19 approach one another, upon assembly of the coupling, the ring is collapsed, that is, the sides 24 are caused to approach and thereby reduce the included angle and thus increase the radial thickness of the ring and in consequence reduce the interior diameter thereof. As the sides approach, the extreme inner edges 26 scrape over the surface of the pipe, removing the enamel and any superficial film of dirt or other insulation, and permitting the ring, and hence the coupler, to make an intimate contact which grips the pipe and establishes a good ground connection between the coupler and the pipe.

The ring 22 in any of its forms may be split, as at 27, if desired, and the coacting outer surfaces so proportioned that their first movement of approach will contract the ring radially and thus reduce its over-all diameter by closing the split 27. In subsequent movements the inner separated edges of the ring are collapsed as above explained thereby reducing its inside diameter.

In Figure 10 there is indicated, in dotted lines, the relative size and shape of a sealing ring 22, split at 27, and V-shaped in cross-section, prior to contraction by the cooperating surfaces 18 and 19. As the surfaces 18 and 19 are brought to bear upon the ring, the split 27 is contracted as shown in the full line figure and the walls 24 collapsed so that the included angle X is reduced and the inner diameter of the ring is reduced over and above that caused by the contraction of the split 27. Thus the surfaces 18 and 19 of the coupler 11 and gland nut 17 working against the ring cause first, a reduction in the outside diameter of the ring 22, and subsequently a reduction in the inner diameter occasioned by pressing the edges of walls 24 together and this operation is accompanied by a scraping of the edges 26 over the surface of the pipe P to remove enamel or a superficial layer of dirt or insulation therefrom and to intimately grip the pipe and establish a ground connection.

One of the thin edges 26 tends to work its way in under the coupler sleeve 14 between its inner cylindrical wall and the outer pipe wall, and the other edge works in under the gland nut 17 in a similar manner. The sliding pressure generated between the two approaching angular ring surfaces 18 and 19 reacts on the ring walls 24 to effect the flowing of said ring edges under the coupler sleeve and gland nut and the ring 22 is preferably of ductile metal to aid in this operation so that intimate ring contact with the pipe is attained.

Figures 6, 7 and 9 illustrate the invention applied to a coupler to join adjacent ends of two pipes P. A coupler member 111 is provided with oppositely extending outwardly threaded necks 114 adapted to receive, respectively, the ends of pipes P. The extremity of each neck 114 is formed with a bevelled gland ring wedging surface 18 exactly the same as that above described in connection with the box hole anchorage coupler and cooperates with the bevelled surface 19 on a gland nut 17. The function of the gland nuts 17 and the action of the bevelled surfaces 18 and 19 upon the gland rings 22 are also exactly as previously described for the box coupler in earlier figures.

By the term pipe coupler, it is intended to include any device applicable to couple a pipe to another object whether an outlet box or another pipe. It is seen that an improved coupler is produced, the novel sealing and anchorage gland ring 22 of which has intimate engagement with a pipe P in such manner that the ring is caused to be reduced in one or another or both of two degrees, i. e. its outside or over-all diameter and/or its inside diameter is reduced, and a good ground connection is assured by the scraping action of edges 26 of the ring over the pipe P. The second size reduction leaves the outside or apex diameter unchanged so that the apex or arched rim of ring 22 is backed up by the gland nut.

It is the second reduction, i. e. the closing together of the adjacent circular ring edges 26 which accomplishes the ultimate compression and positive sealing and fixing of the gland ring against the pipe. Approach of the two edges 26 are about the ring apex in a pivotal sense so that as the edges 26 move toward each other the inside diameter of the ring is gradually reduced independently of the over-all diameter thereof.

The principle of the invention may be embodied in various devices for building construction, electrical work and other uses.

What I claim is:

1. A coupler comprising, a coupler member having an outwardly threaded neck terminating in a circumferential inwardly bevelled ring receiving and reducing surface, a gland nut adapted to be screwed onto the neck and formed with an inwardly bevelled ring receiving and reducing surface cooperating with the first named surface, and a split ductile gland ring being V-shaped in cross-section such that the sides of the ring are at a greater angle than the bevel of the gland nut disposed between the member and nut surfaces and adapted to have its over-all diameter first-reduced and subsequently its radial thickness reduced by approach of the surfaces.

2. A coupler comprising a coupler member having a passage therein to receive a part to be coupled, a gland member adjacent the end of the coupler member, means to force the gland member toward the coupled member, a gland ring of ductile metal disposed between said coupler member and said gland member, said ring being formed in cross-section having sides with edges adapted for contacting with the part to be coupled, the sides of said ring being distortable to bring said edges into intimate contact with said part to be coupled within the coupler member, and means for engaging said ring under pressure to bring the sides thereof nearer together to force the ductile metal thereof into the interstices of the surface of the part to be coupled.

3. A coupler comprising a coupler member having an outwardly threaded neck, a gland nut adapted to be screwed onto the neck, and a gland ring of ductile metal disposed between said gland nut and the end portion of said neck, said ring being arched in cross-section so that the sides thereof may be forced toward each other under pressure, the bearing surfaces of the said nut and of said end portion against the said sides being so formed as to force the ductile metal thereof into the interstices of the surface of the part to be coupled when the said nut is screwed inwardly on the neck to distort the metal of said ring.

4. A coupler comprising a coupler member having a passage therein to receive a part to be coupled, a gland member adjacent the end of the coupler member, a split ring of ductile metal disposed between said coupler member and said gland member, said ring being arched in cross-section so that the edges thereof may be forced toward each other under pressure and means for engaging said ring under pressure to radially reduce the over-all diameter of the ring and to bring the said edges nearer together to scrape the surface of the part to be coupled and force the ductile metal into the interstices of the surface thereof.

In testimony whereof I affix my signature.

LEWIS H. CHURCH.